(12) United States Patent
Lawyer (10) Patent No.: US 11,718,411 B2
(45) Date of Patent: *Aug. 8, 2023

(54) FUEL CONTAINMENT SYSTEM

(71) Applicant: The Boeing Company, Chicago, IL (US)

(72) Inventor: Michael A. Lawyer, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,343

(22) Filed: Jul. 8, 2022

(65) Prior Publication Data
US 2022/0348344 A1    Nov. 3, 2022

Related U.S. Application Data

(63) Continuation of application No. 16/571,686, filed on Sep. 16, 2019, now Pat. No. 11,414,205.

(60) Provisional application No. 62/862,084, filed on Jun. 16, 2019.

(51) Int. Cl.
| | | |
|---|---|---|
| *B64D 37/08* | (2006.01) | |
| *B64D 37/04* | (2006.01) | |
| *B64C 1/12* | (2006.01) | |
| *B64C 1/10* | (2006.01) | |

(52) U.S. Cl.
CPC ............ *B64D 37/08* (2013.01); *B64C 1/10* (2013.01); *B64C 1/12* (2013.01); *B64D 37/04* (2013.01)

(58) Field of Classification Search
CPC ........ B64D 37/02; B64D 37/04; B64D 37/08; B64D 37/14; B64D 37/32
See application file for complete search history.

(56) References Cited

U.S. PATENT DOCUMENTS

| | | | |
|---|---|---|---|
| 7,357,355 B2 | 4/2008 | Howe | |
| 2009/0078826 A1 | 3/2009 | Haensch et al. | |
| 2009/0090724 A1 | 4/2009 | Childress et al. | |
| 2014/0231586 A1 | 8/2014 | Brown et al. | |
| 2021/0061484 A1* | 3/2021 | Lawyer | B64D 37/08 |

OTHER PUBLICATIONS

Office Action, dated Dec. 7, 2021, regarding U.S. Appl. No. 16/571,686, 19 pages.
Notice of Allowance, dated Apr. 20, 2022, regarding U.S. Appl. No. 16/571,686, 19 pages.

* cited by examiner

*Primary Examiner* — Timothy D Collins
*Assistant Examiner* — Justin Michael Heston
(74) *Attorney, Agent, or Firm* — Yee & Associates, P.C.

(57) ABSTRACT

A fuel containment system for an aircraft is provided. The fuel containment system comprises an upper fuel barrier under a cabin floor, an aft wheel well bulkhead, an aft fuel barrier opposite the aft wheel well bulkhead, a lower fuel barrier associated with a cargo floor, and a lower fuselage skin panel. A fuel tank is created by the upper fuel barrier, the aft wheel well bulkhead, the aft fuel barrier, the lower fuel barrier, and the lower fuselage skin. The fuel tank is integrated into the aircraft and existing structural components are sealed to prevent fuel from leaking out of the integrated fuel tank.

20 Claims, 11 Drawing Sheets

FUEL CONTAINMENT SYSTEM

CROSS-REFERENCE TO RELATED APPLICATIONS

This application is a continuation application of U.S. patent application Ser. No. 16/571,686, filed Sep. 16, 2019, now U.S. Pat. No. 11,414,205, issued Jul. 27, 2022, entitled "Fuel Containment System" which claims the benefit of U.S. Provisional Patent Application No. 62/862,084, filed Jun. 16, 2019, both of which are herein incorporated by reference.

BACKGROUND INFORMATION

1. Field

The present disclosure relates generally to aircraft. More specifically, the present disclosure relates to a fuel containment system designed to increase fuel capacity for an aircraft.

2. Background

Airlines are under constant pressure to more efficiently transport passengers and cargo. One of the ways to make travel more efficient is to minimize stops between destinations. To do this, airlines need more range out of their aircraft. Range is often determined by fuel capacity. Generally, the more fuel an aircraft can carry, the longer it can fly. Adding fuel not only makes flights more efficient but also opens the possibility that an airline can serve new routes.

Installing auxiliary fuel tanks in an aircraft improves the fuel capacity of that aircraft. These auxiliary fuel tanks store fuel that is then pumped into a main fuel tank to power aircraft engines. Auxiliary fuel tanks may be installed in compartments within the fuselage of the aircraft. They may be retro-fitted and removable. For example, an auxiliary fuel tank may be added to the cargo area to replace a cargo container or bulk cargo.

While adding fuel capacity extends aircraft range, the auxiliary fuel system increases the weight of the aircraft. This added weight cuts into the range gains from additional fuel and increases airplane empty weight.

The airline industry has a need for expanding fuel capacity without adding unnecessary weight to the aircraft. Therefore, it would be desirable to have a method and apparatus that takes into account at least some of the issues discussed above, as well as other possible issues.

SUMMARY

An illustrative embodiment of the present disclosure provides a fuel containment system. The fuel containment system comprises an upper fuel barrier, an aft wheel well bulkhead, an aft fuel barrier opposite the aft wheel well bulkhead, a lower fuel barrier associated with a cargo floor, and a lower fuselage skin panel. A fuel tank is created by the upper fuel barrier, the aft wheel well bulkhead, the aft fuel barrier, the lower fuel barrier and the lower fuselage skin panel. The upper fuel barrier is located below a cabin floor and configured to prevent fuel from contacting the cabin floor. The lower fuel barrier is the cargo floor, having been properly sealed to prevent leakage. The lower fuselage skin panel forms two curved sides of the fuel tank. Longitudinal beams under the cabin floor run a length from the aft wheel well bulkhead to the aft fuel barrier.

Another illustrative embodiment of the present disclosure provides a method for containing fuel in an aircraft. An upper fuel barrier is installed below a cabin floor. An electrical system runs between the upper fuel barrier and the cabin floor. A lower fuel barrier, most commonly the cargo floor, is sealed to prevent fuel leaks. An aft wheel well bulkhead is sealed as well. An aft fuel barrier is installed opposite the aft wheel well bulkhead. Fuel is stored in a fuel tank created by the upper fuel barrier, the aft wheel well bulkhead, the aft fuel barrier, the lower fuel barrier, and a lower fuselage skin on the sides in the cargo bay of the aircraft. A number of stanchions are removed from the cargo bay to increase a capacity of the fuel tank.

A further illustrative embodiment of the present disclosure provides a fuel containment system having an upper fuel barrier, an aft wheel well bulkhead, an aft fuel barrier opposite the aft wheel well bulkhead, and a lower fuselage skin panel. The upper fuel barrier is located below a cabin floor. The fuel tank is created by the upper fuel barrier, the aft wheel well bulkhead, the aft fuel barrier, and the lower fuselage skin panel. Longitudinal beams under the cabin floor run from the aft wheel well bulkhead to the aft fuel barrier. The fuel tank may remain under cabin pressure. A gas supply source associated with a number of transport elements supplies a gas into the fuel tank to replace the fuel pumped out of the fuel tank. Fuel supply lines are located inside the fuel tank, while electrical systems are routed through a channel system between the cabin floor and the upper fuel barrier. Support members are located inside the fuel tank as well.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it is desirable to improve flight range by adding fuel capacity to an aircraft. Currently employed solutions use existing aircraft designs and retrofit auxiliary fuel tanks into the cargo bay. Airlines replace cargo with these auxiliary fuel tanks. While the auxiliary fuel tanks increase fuel capacity, they reduce usable cargo space. The reduction in cargo space limits revenue for the airline.

The illustrative embodiments further recognize and take into account that it is desirable to keep the aircraft as light as possible. Each auxiliary fuel tank installed in the cargo bay adds more structure and, in turn, more weight to the aircraft. Support structures and tank walls must be added to address crashworthiness concerns. The weight increase may stunt range gains more than desired.

Therefore, it is desirable to improve aircraft range while minimizing weight increases and providing effective use of cargo space and thus, keeping consistent cargo revenue for the airline. The illustrative embodiments address these concerns, providing an integrated fuel tank built into the fuselage of the aircraft. Instead of creating a separate tank and adding more weight to the aircraft, the illustrative embodiments use existing barriers within the cargo bay as tank walls. Supply lines, transport elements, hydraulic systems, and electrical lines are rerouted to accommodate this new design.

Thus, the disclosed embodiments provide a fuel containment system having an upper fuel barrier, an aft wheel well bulkhead, an aft fuel barrier opposite the aft wheel well bulkhead, a lower fuel barrier, and a lower fuselage skin panel. A fuel tank is created by the upper fuel barrier, the aft wheel well bulkhead, the aft fuel barrier, the lower fuel barrier, and the lower fuselage skin panel on the sides. This integrated fuel tank has a capacity of approximately twice the volume of currently used tanks and adds less than half the weight to the aircraft.

Figure 1:
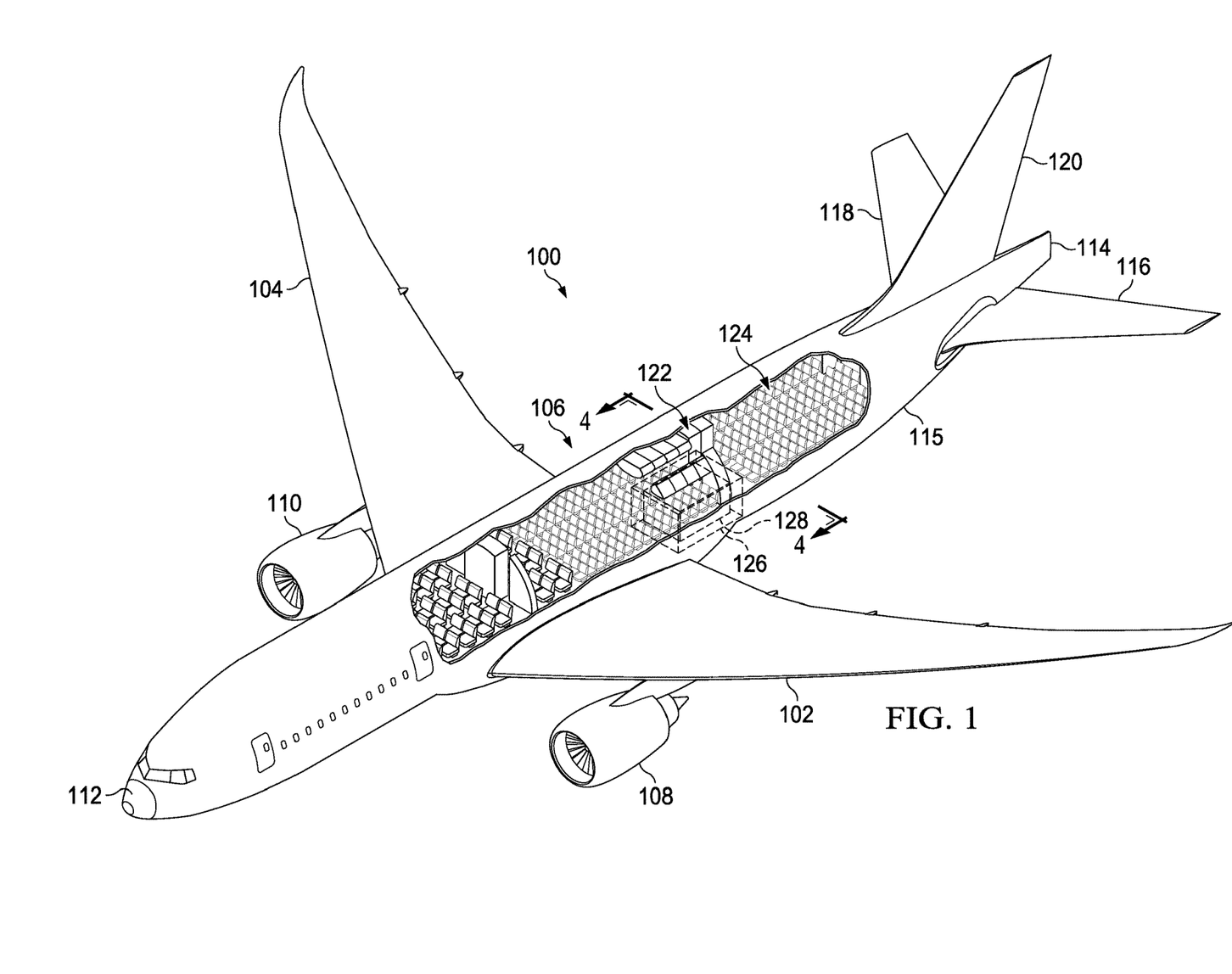
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 includes engine 108 attached to wing 102 and engine 110 attached to wing 104.

Fuselage 106 has nose section 112, tail section 114, and skin 115. Horizontal stabilizer 116, horizontal stabilizer 118, and vertical stabilizer 120 are attached to tail section 114 of fuselage 106.

In this illustrative example, passenger cabin 122 includes seats 124. Cargo bay 126 includes fuel tank 128.

Figure 2:
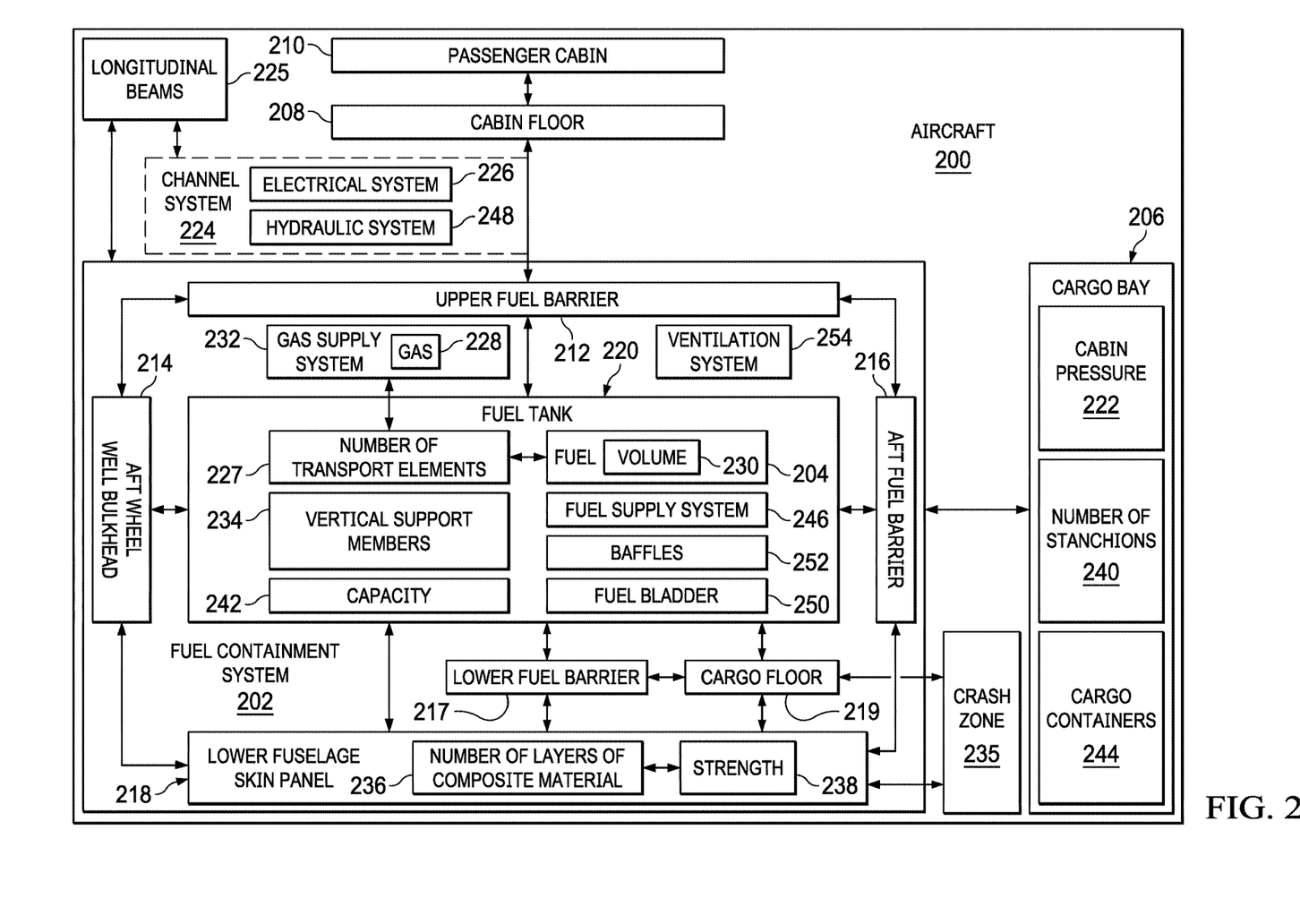
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 is an example of one type of platform where fuel containment system 202 may be implemented. Fuel containment system 202 uses existing structural components of aircraft 200 to store fuel 204.

As depicted, fuel containment system 202 is located in cargo bay 206 of aircraft 200 below cabin floor 208 of passenger cabin 210. Fuel containment system 202 comprises upper fuel barrier 212, aft wheel well bulkhead 214, aft fuel barrier 216, lower fuel barrier 217, and lower fuselage skin panel 218. Fuel tank 220 is created by upper fuel barrier 212, aft wheel well bulkhead 214, aft fuel barrier 216, and lower fuel barrier 217. Lower fuel barrier 217 may be associated with cargo floor 219, integrated in cargo floor 219, or cargo floor 219 may be used as lower fuel barrier 217 after proper seal.

When cargo floor 219 is absent in the area where fuel tank 220 is integrated, lower fuel barrier 217 may be associated with lower fuselage skin panel 218, integrated in lower fuselage skin panel 218, or lower fuselage skin panel 218 may be used as lower fuel barrier 217 after proper seal. Since fuel tank 220 is integrated into cargo bay 206, fuel tank 220 may be under cabin pressure 222.

Aft wheel well bulkhead 214 and lower fuselage skin panel 218 are standard components in aircraft 200. In other words, aft wheel well bulkhead 214 and lower fuselage skin panel 218 are part of the typical design of aircraft 200. Upper fuel barrier 212 and aft fuel barrier 216 must be added to the standard design specifications for aircraft 200. However, these structural additions, as well as the other supports and related components may add less than 0.6 lb. per gallon of fuel.

In this illustrative example, upper fuel barrier 212 is a structural component installed below cabin floor 208. Upper fuel barrier 212 is configured to prevent fuel 204 from leaking out of fuel tank 220 and contacting cabin floor 208 or other components within passenger cabin 210. Upper fuel barrier 212 is oriented opposite lower fuel barrier 217 and provides the upper boundary for fuel tank 220.

Channel system 224 exists between upper fuel barrier 212 and cabin floor 208. Channel system 224 is created by longitudinal beams 225. In the currently used design for aircraft 200, beams below passenger cabin 210 run in the transverse direction, from one side to another. In an illustrative embodiment, beams are run longitudinally instead, thus creating a channel between each pair of longitudinal beams 225 such that various transport elements may run through channel system 224.

Electrical system 226 is routed through channel system 224. Electrical system 226 may comprise a number of electrical lines that provide electricity to various parts of aircraft 200. Additional transport elements for electricity, fluid, gas, fiber optics, or other systems also may be routed through channel system 224, depending on the particular implementation.

As used herein, "a number of" when used with reference to items means one or more items. Thus, a number of electrical lines is one or more electrical lines.

Aft wheel well bulkhead 214 is a structural component that provides the forward side wall for fuel tank 220. Aft wheel well bulkhead 214 supports the differential pressure between cabin air and ambient air. When fuel tank 220 is under cabin pressure 222, number of transport elements 227 are needed between fuel tank 220 and cargo bay 206. Number of transport elements 227 are in fluid communication with fuel tank 220. Number of transport elements 227 are configured to supply gas 228 to fuel tank 220 to replace volume 230 of fuel 204 pumped out of fuel tank 220.

In this illustrative example, gas 228 may comprise at least one of nitrogen, other inert gases, or some combination thereof to substantially reduce the risk of combustion. Gas supply system 232 comprises a number of components configured to supply gas 228 to fuel tank 220. Gas supply system 232 may be a compressor, a pump, or some other suitable system. In some illustrative examples, gas supply system 232 may include nitrogen gas system (NGS) plumbing.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

As illustrated, vertical support members 234 are associated with at least one of aft wheel well bulkhead 214 or aft fuel barrier 216. Vertical support members 234 may be located inside or outside of the fuel barrier. For example, vertical support members 234, when associated with aft wheel well bulkhead 214 are located inside fuel tank 220. Vertical support members 234 associated with aft fuel barrier 216 may be located outside of fuel tank 220. Vertical support members 234 provide structural support for aft wheel well bulkhead 214, aft fuel barrier 216, and fuel tank 220. Longitudinal beams 225 connect to vertical support members 234.

Aft fuel barrier 216 is a structural component that provides the aft side wall of fuel tank 220. Aft fuel barrier 216 is positioned opposite aft wheel well bulkhead 214.

The bottom of fuel tank 220 is bound by lower fuel barrier 217. The other two sides of fuel tank 220 are bound by the curvature of lower fuselage skin panel 218. No additional structural barriers are used for the sides of fuel tank 220. Instead, lower fuselage skin panel 218 serves as the barrier.

More volume 230 of fuel 204 can be stored in fuel tank 220 in this illustrative example as compared to currently used fuel tanks because the sides of fuel tank 220 are bound by the fuselage skin. In some illustrative examples, no floor exists between lower fuselage skin panel 218 and fuel 204 in fuel tank 220. The elimination of a cargo floor allows for even more fuel 204 to be stored.

Aircraft 200 must qualify for crashworthiness to be certified to fly. Crashworthiness certification requires aircraft 200 to land on its belly without landing gear and fuel tank 220 must remain intact. Additional structure, liners, a bladder, or increased fuselage skin thickness at the bottom of the aircraft 200 may be needed.

When cargo floor 219 remains present, crash zone 235 is located between cargo floor 219 and lower fuselage skin panel 218. When cargo floor 219 is absent, number of layers of composite material 236 may be bonded to lower fuselage skin panel 218 underneath fuel tank 220. Number of layers of composite material 236 are configured to increase strength 238 of lower fuselage skin panel 218. Number of layers of composite material 236 may take the form of doubler plies in this illustrative example. The doubler plies may be a separate bonded skin or simply an increased skin thickness of lower fuselage skin panel 218.

Cargo bay 206 of aircraft 200 has number of stanchions 240. Number of stanchions 240 provide structural support for cabin floor 208. At least one of number of stanchions 240 has been removed to increase capacity 242 of fuel tank 220.

As illustrated, cargo or cargo containers 244 are stored in cargo bay 206. Fuel tank 220 has a length of two cargo containers 244 in cargo bay 206 in this illustrative example. In other illustrative examples, fuel tank 220 may take up the space of more or fewer cargo containers.

Fuel containment system 202 also comprises fuel supply system 246. Fuel supply system 246 is located inside fuel tank 220. Fuel supply system 246 may be configured to transport fuel in and out of fuel tank 220 at different times. These systems may include at least one of plumbing, pumps, sumps, tubing, drains, vents, and other suitable components.

In this illustrative example, fuel supply system 246 is located inside fuel tank 220 to eliminate costly re-routing of the system. In addition, since fuel supply system 246 is within the fuel barrier, space outside fuel tank 220 is not needed to house such components, thus increasing capacity 242 of fuel tank 220. Hydraulic system 248 also may be present and located outside of fuel tank 220.

Upper fuel barrier 212, aft wheel well bulkhead 214, aft fuel barrier 216, lower fuel barrier 217, and lower fuselage skin panel 218 are sealed in this illustrative example. Sealing of these components prevents fuel 204 from leaking out of fuel tank 220 and damaging components within cargo bay 206 or passenger cabin 210.

In some illustrative examples, fuel containment system 202 may comprise fuel bladder 250. In such a case, fuel tank 220 may not need additional sealant. Instead, fuel bladder 250 provides a removable, sealed, compressible bladder for containment of fuel 204.

In this illustrative example, fuel bladder 250 also may provide additional crashworthiness protection. For instance, a tear resistant fuel bladder 250 may satisfy crashworthiness because damage to the structure upon impact would not breach the fuel barrier.

Fuel containment system 202 may comprise baffles 252 and ventilation system 254 in some illustrative examples. Baffles 252 may take the form of baffle plates inside fuel tank 220. Baffles 252 are configured to direct the flow of fuel 204 in fuel tank 220 to reduce sloshing of fuel 204 in an undesired manner during operation of aircraft 200. In other illustrative examples, other mechanisms may be used to address sloshing of fuel 204.

Ventilation system 254 comprises several ducts. A portion of fuel tank 220 may be chamfered to allow for ventilation system 254 or other ductwork to run the length of fuel tank 220 outside of fuel tank 220. These ducts may be return air ducts, auxiliary power unit (APU) ducts, environmental ducts, or some other suitable type of ventilation.

In some illustrative examples, other components may be added to fuel containment system 202. For example, without limitation, horizontal stringers may be positioned at the bottom of fuel tank 220. Fuel tank 220 may have a truss structure. In other illustrative examples, a keel chord extension may be present.

Reinforcement structures may be added at various points around fuel containment system 202. Frame pads also may be used. Access doors may be installed in one or more areas of fuel containment system 202 or fuel tank 220. Additional wiring, switches, and electrical sources may be added to electrical system 226 in some cases.

To further reduce weight and provide adequate space for fuel tank 220, some components may be removed from the traditional design of aircraft 200. For example, without limitation, liners, insulation, or other components may be removed.

Thus, with an illustrative embodiment, and by integrating fuel tank 220 into the fuselage of aircraft 200, capacity 242 of fuel tank 220 is substantially increased while adding as little additional structure as possible. The fuselage has many panels that are already designed to hold pressure. These panels are utilized as fuel barriers rather than adding more panels.

The impact on cargo space is the same or reduced over currently used auxiliary fuel tank solutions. For example, with the use of an illustrative embodiment, aircraft 200 can keep 21 inches of cargo space. Since fuel tank 220 expands farther to the sides in cargo bay 206, more volume is realized with less length. As a result, the integrated fuel tank 220 increases revenue ability from cargo while also increasing the range of aircraft 200

An illustrative embodiment can also be used in conjunction with removable auxiliary tanks. For instance, fuel tank 220 may be integrated into cargo bay 206 while an auxiliary tank may be placed in cargo bay 206 in another portion of aircraft 200, depending on the needs of the flight.

Figure 3:
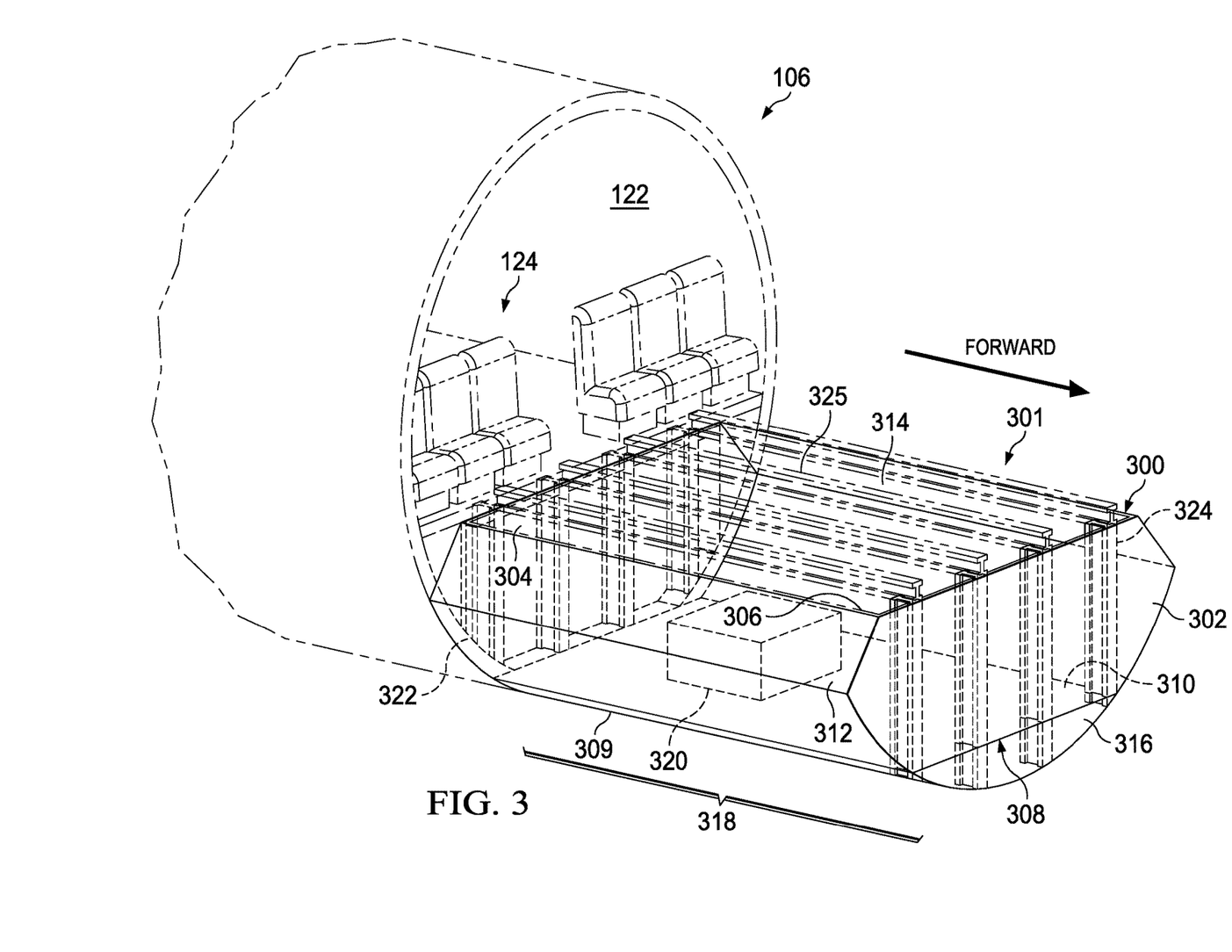
FIG. 3 is an illustration of a perspective view of a fuselage section with an integrated fuel tank in accordance with an illustrative embodiment.

With reference next to FIG. 3, an illustration of a perspective view of a fuselage section with an integrated fuel tank is depicted in accordance with an illustrative embodiment. A perspective view of aircraft 100 from FIG. 1 is shown with a portion of the skin of fuselage 106 removed. FIG. 3 illustrates an example of physical implementations for components within aircraft 200 as shown in block form in FIG. 2. The forward portion of the aircraft is indicated by an arrow.

As depicted, fuel tank 128 in FIG. 1 takes the form of integrated fuel tank 300. Integrated fuel tank 300 and the components described herein are part of fuel containment system 301 in this illustrative example.

Integrated fuel tank 300 comprises aft wheel well bulkhead 302, aft fuel barrier 304, upper fuel barrier 306, and lower fuel barrier 308. Lower fuel barrier 308 takes the form of cargo floor 310 in this illustrative example. Upper fuel barrier 306 is shown in phantom in this view. Integrated fuel tank 300 has chamfered edge 312 and chamfered edge 314. Crash zone 316 is present between cargo floor 310 and lower fuselage skin 309. Length 318 of integrated fuel tank 300 is approximately the same length as two cargo containers (not shown in this view).

In this illustrative example, fuel supply system 320 is inside integrated fuel tank 300. Integrated fuel tank 300 is shown without fuel.

Vertical support members 322, vertical support members 324, and longitudinal beams 325 are shown. Vertical support members 322 are on the aft side of aft fuel barrier 304, while vertical support members 324 are located inside integrated fuel tank 300.

Figure 4A:
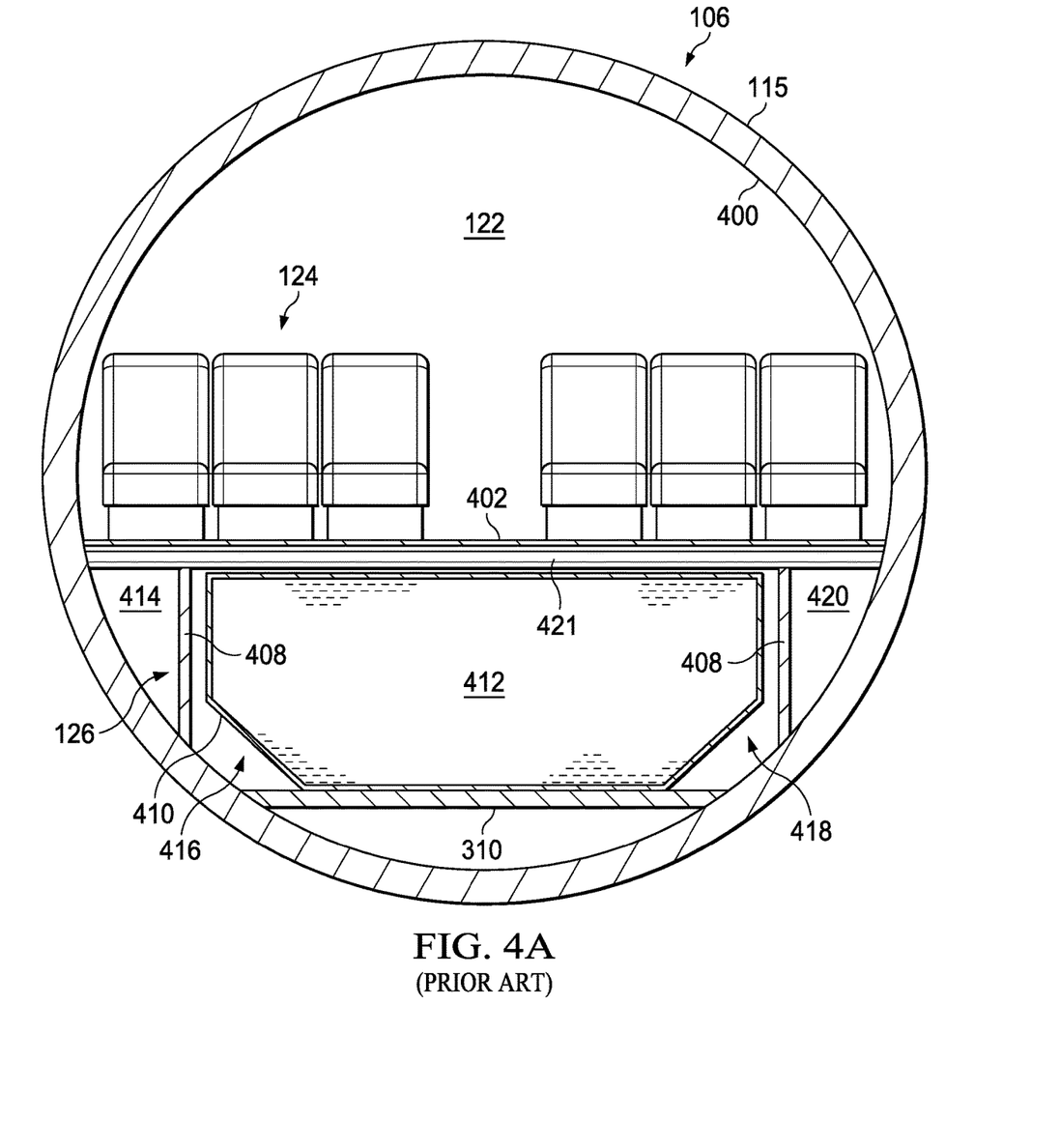
FIG. 4A is an illustration of a cross-sectional view of a fuselage section with an auxiliary fuel tank in accordance with the prior art.
Figure 4B:
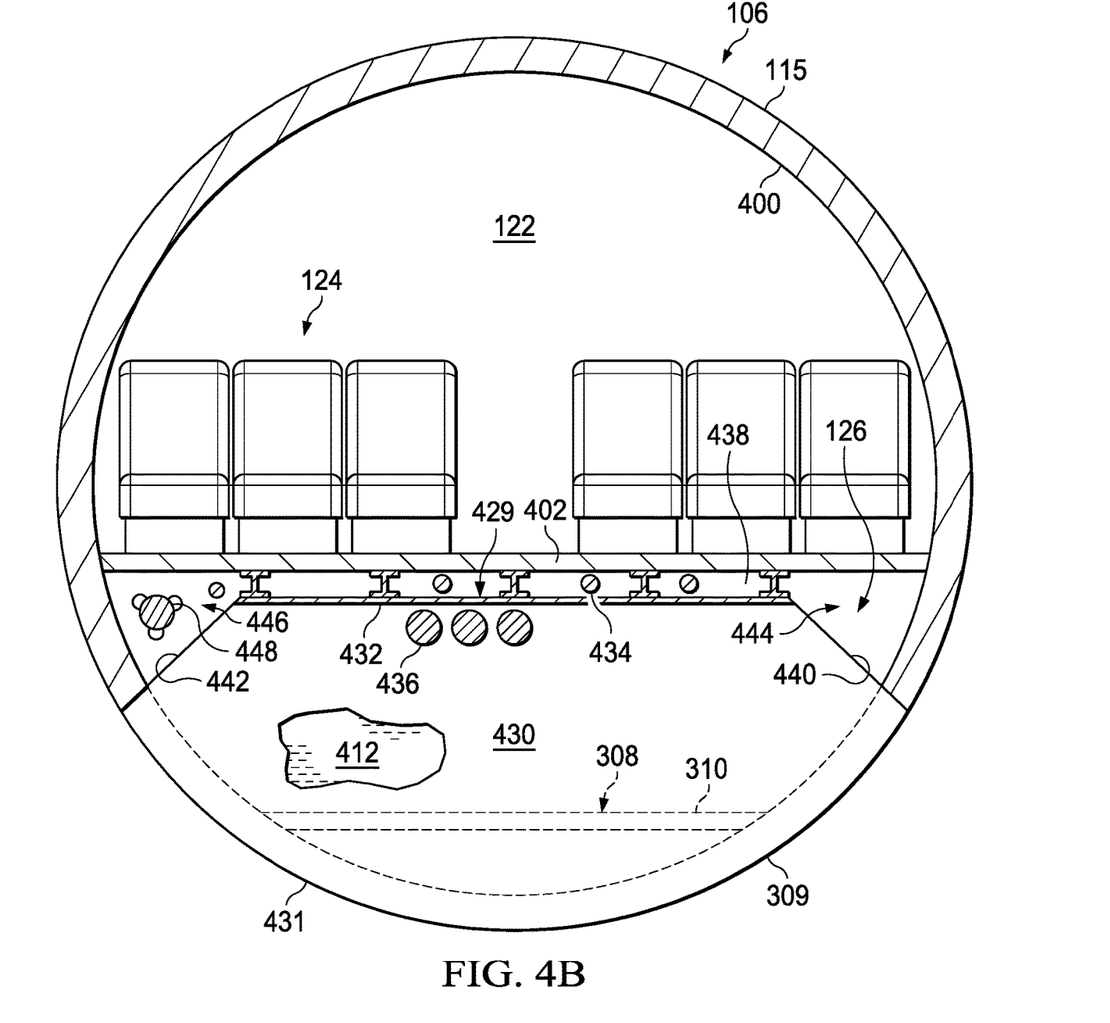
FIG. 4B is an illustration of a cross-sectional view of a fuselage section with an integrated fuel tank in accordance with an illustrative embodiment.

FIG. 4A and FIG. 4B are comparative cross-sectional views of the prior art and the integrated fuel tank as described herein, taken along lines 4-4 in FIG. 1. FIG. 4A is an illustration of a cross-sectional view of a fuselage section with an auxiliary fuel tank in accordance with the prior art, while FIG. 4B is an illustration of a cross-sectional view of a fuselage section with an integrated fuel tank in accordance with an illustrative embodiment.

FIG. 4A shows fuselage 106 with skin 115 and frames 400 around the inside of the fuselage 106 and running lateral to the fuselage length. Cabin floor 402 spans fuselage 106 and supports seats 124 and passenger walking traffic in passenger cabin 122.

As illustrated, cargo floor 310 spans a lower section of fuselage 106 and supports loose cargo and cargo containers in cargo bay 126. Stanchions 408 support the main deck floor by attaching to frames 400 in the cargo bay 126. To increase range of aircraft 100, auxiliary fuel tank 410 is added to cargo bay 126 in place of a cargo container. Auxiliary fuel tank 410 can be filled with fuel 412 to increase the range of aircraft 100. Capacity of fuel 412 in auxiliary fuel tank 410 is approximately 790 gallons.

In this illustrative example, cargo bay 126 has dead space 414, dead space 416, dead space 418, and dead space 420 around auxiliary fuel tank 410. These spaces may be used to route fuel supply lines, ventilation, hydraulic components, or electrical systems. However, such space restricts the fuel capacity of auxiliary fuel tank 410. Horizontal beam 421 is shown above auxiliary fuel tank 410 connecting to stanchions 408 on either side of auxiliary fuel tank 410.

FIG. 4B shows fuselage 106 with skin 115 and frames 400 supporting skin 115. Cabin floor 402 separates the passenger cabin 122 from cargo bay 126, below.

Fuel containment system 429 comprises integrated fuel tank 430 bounded by cargo floor 310 on bottom, by lower fuselage skin panel 431 on the sides, and by upper fuel barrier 432 on top. Upper fuel barrier 432 prevents fuel 412 from wetting cabin floor 402 and electrical systems 434.

Electrical systems 434 run outside upper fuel barrier 432. Fuel systems 436 runs through integrated fuel tank 430. Frames 400 are in integrated fuel tank 430 and increases the fuel capacity by the volume of space between frames 400 to the height of frames 400. Stanchions 408 may be removed to increase fuel volume in integrated fuel tank 430 or stanchions 408 may remain. If stanchions 408 remain, stanchions 408 are sealed at upper fuel barrier 432 and cargo floor 310. Fuel capacity goes all the way to the sides of the cargo bay skin in this illustrative example. Longitudinal support beams 438 run under cabin floor 402.

As illustrated, upper fuel barrier 432 has chamfered edge 440 and chamfered edge 442. Lower fuselage skin panel 431, chamfered edge 440 of upper fuel barrier 432, and cabin floor 402 connect to form channel 444. In a similar fashion, lower fuselage skin panel 431, chamfered edge 442 of upper fuel barrier 432, and cabin floor 402 connect to form channel 446. Electrical systems 434 run through channels created between pairs of longitudinal support beams 438, while ventilation system 448 runs through channel 446 and channel 444.

Figure 5A:
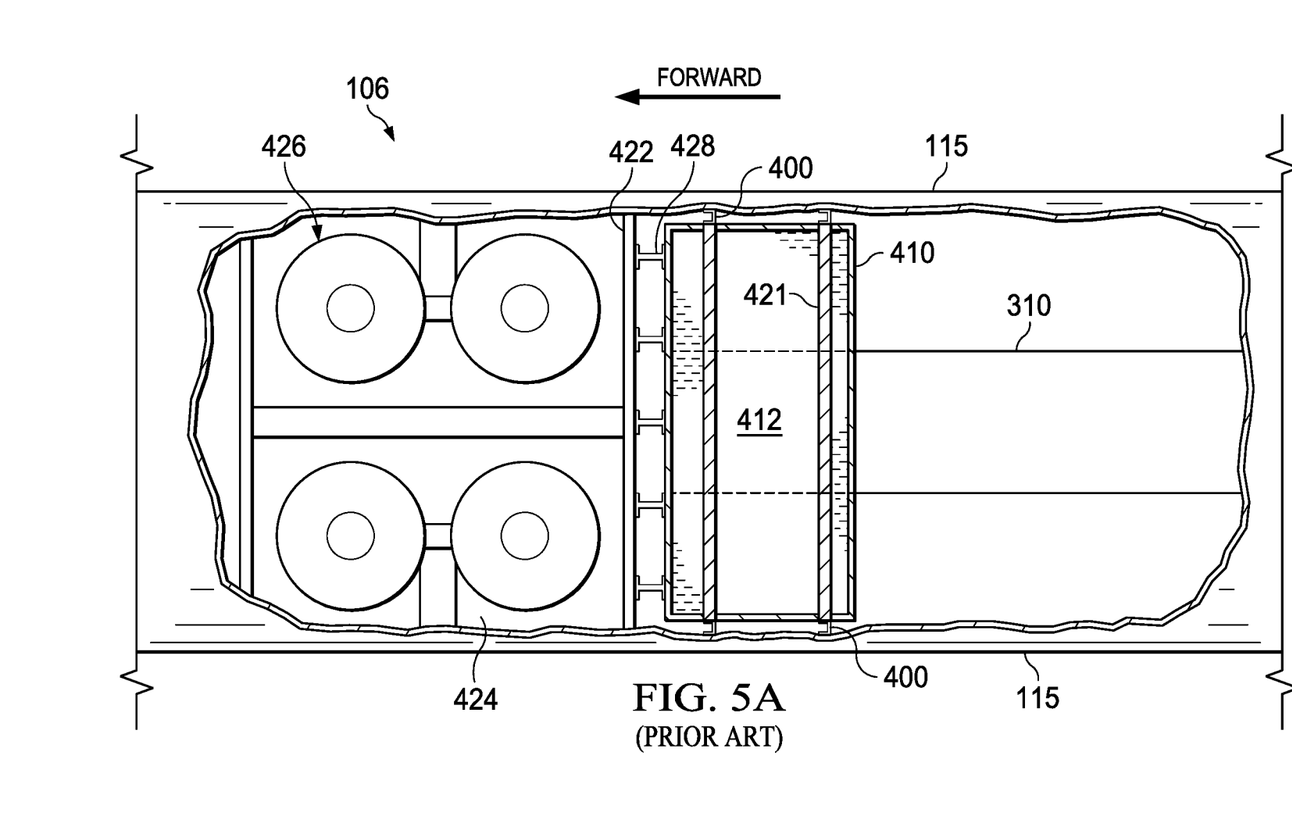
FIG. 5A is an illustration of a cut plan view of a fuselage section with an auxiliary fuel tank in accordance with the prior art.
Figure 5B:
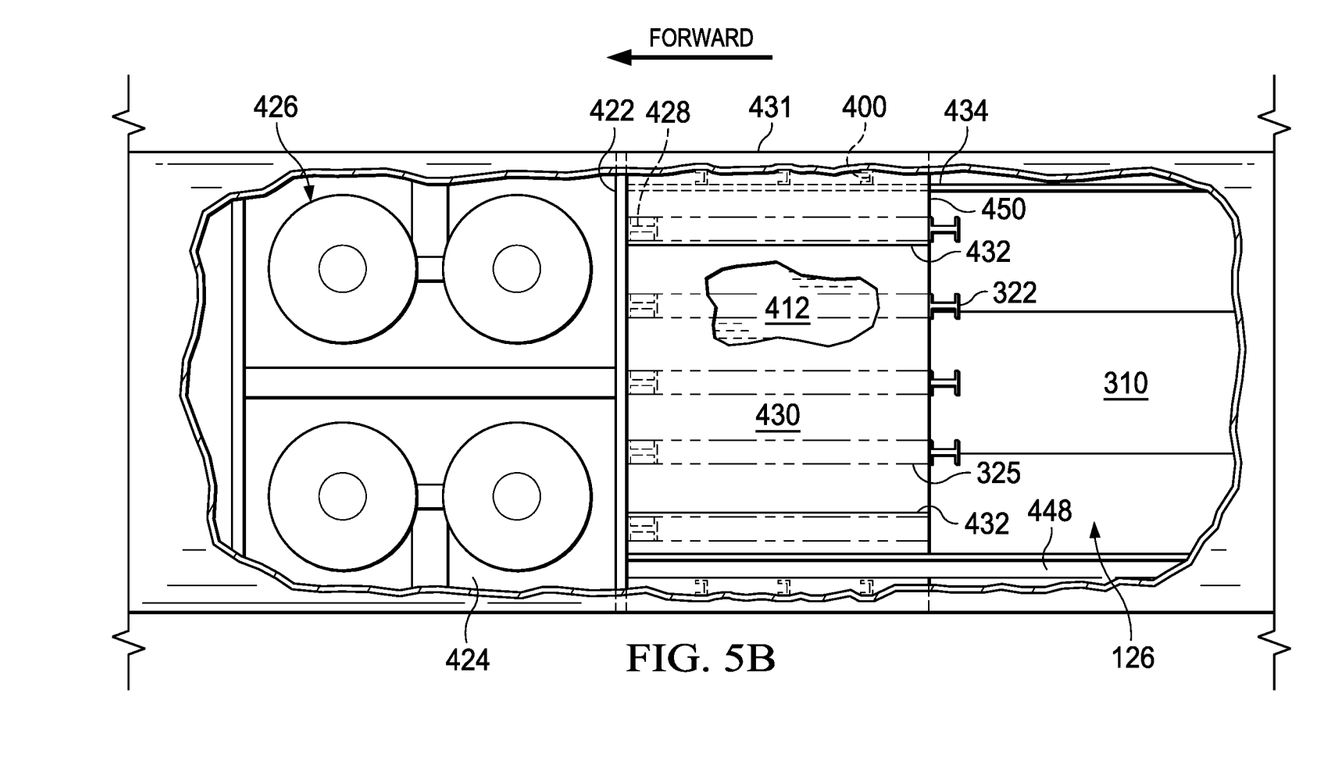
FIG. 5B is an illustration of a cut plan view of a fuselage section with an integrated fuel tank in accordance with an illustrative embodiment.

FIG. 5A and FIG. 5B are comparative cut plan views of aircraft 100 with the prior art and the integrated fuel tank as described herein. FIG. 5A is an illustration of a cut plan view of a fuselage section with an auxiliary fuel tank in accordance with the prior art, while FIG. 5B is an illustration of a cut plan view of a fuselage section with an integrated fuel tank in accordance with an illustrative embodiment.

FIG. 5A shows a top down view of a fuselage 106 where forward is to the left and aft to the right. Auxiliary fuel tank 410 is sitting forward in aft cargo hold adjacent to aft wheel well bulkhead 422. Wheel well 424 is a cut out in fuselage 106 where landing gear 426 is stored. Aft wheel well bulkhead 422 must withstand fuselage pressure and is supported by support members 428 to prevent the planar bulkhead from deforming.

FIG. 5B shows the plan view of fuselage 106 cut away under cabin floor 402. Fuel 412 is bounded on four sides in this figure. The outboard sides are bounded by lower fuselage skin panel 431 with frames 400 inside the fuel barrier. The forward side of the tank is bounded by aft wheel well bulkhead 422 with support members 428 inside the fuel barrier. The aft side of integrated fuel tank 430 is bounded by aft fuel barrier 450. Aft wheel well bulkhead 422 supports the differential pressure so when integrated fuel tank 430 is under cabin pressure, a fluid communication means may be required between integrated fuel tank 430 and cargo bay 126.

Figure 6:
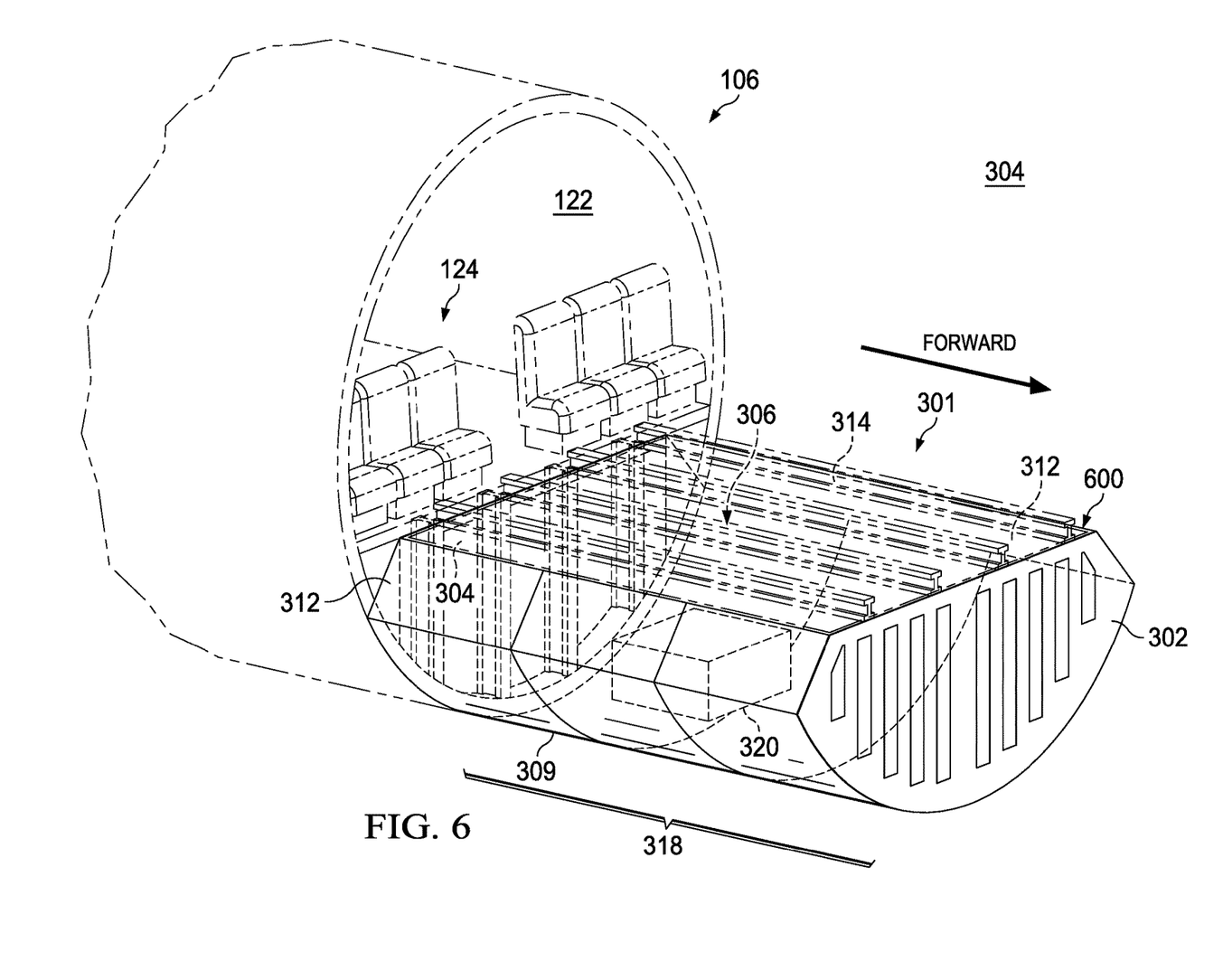
FIG. 6 is an illustration of perspective view of an alternative implementation of an integrated fuel tank in accordance with an illustrative embodiment.

Turning next to FIG. 6, an illustration of a perspective view of an alternative implementation of an integrated fuel tank is depicted in accordance with an illustrative embodiment. FIG. 6 shows an alternative implementation for fuel tank 220 and the components within fuel tank 220 from FIG. 2.

Integrated fuel tank 600 comprises aft wheel well bulkhead 302, aft fuel barrier 304, upper fuel barrier 306, and lower fuselage skin 309. Cargo floor 310 has been removed in this view, thus no crash zone 316 is present.

Figure 7:
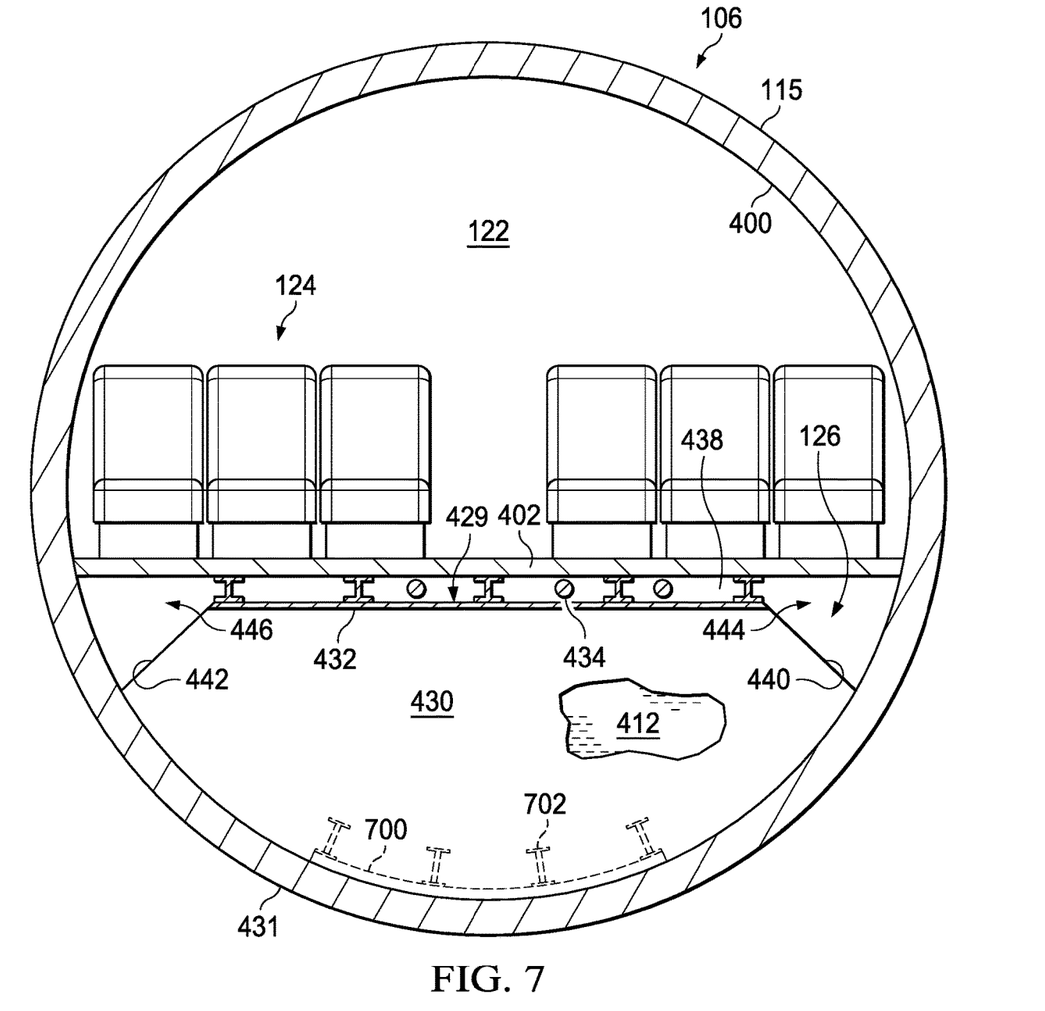
FIG. 7 is an illustration of a cross-sectional view of a reinforced fuselage section with an integrated fuel tank in accordance with an illustrative embodiment.

In FIG. 7, an illustration of a cross-sectional view of a reinforced fuselage section with an integrated fuel tank is depicted in accordance with an illustrative embodiment. Aircraft 100 must qualify for crashworthiness to be certified to fly. Qualification may require additional structure or increased skin thickness or a bladder/liner at the bottom of the airplane. This illustrative example shows the belly of fuselage 106 with doubler plies 700 and support structures 702.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures. Other configurations for a fuel containment system 429 may be implemented other than those shown in FIGS. 3-8.

Although the illustrative embodiments are described with reference to aircraft, the illustrative embodiments may have application to other types of platforms. For example, without limitation, an integrated fuel tank as described herein may be implemented in a mobile platform, a stationary platform, a land-based structure, an aquatic-based structure, or a space-based structure. More specifically, an integrated fuel tank may be used in a rotorcraft, a surface ship, a tank, a personnel carrier, a train, a spacecraft, a space station, a satellite, a submarine, an automobile, a power plant, a bridge, a dam, a house, a manufacturing facility, a building, and other suitable platforms.

The terms "lower fuselage skin" and "lower fuselage skin panel" may be used interchangeably. One or more fuselage skin panels may be used to form two of the sides of the integrated fuel tank.

Figure 8:
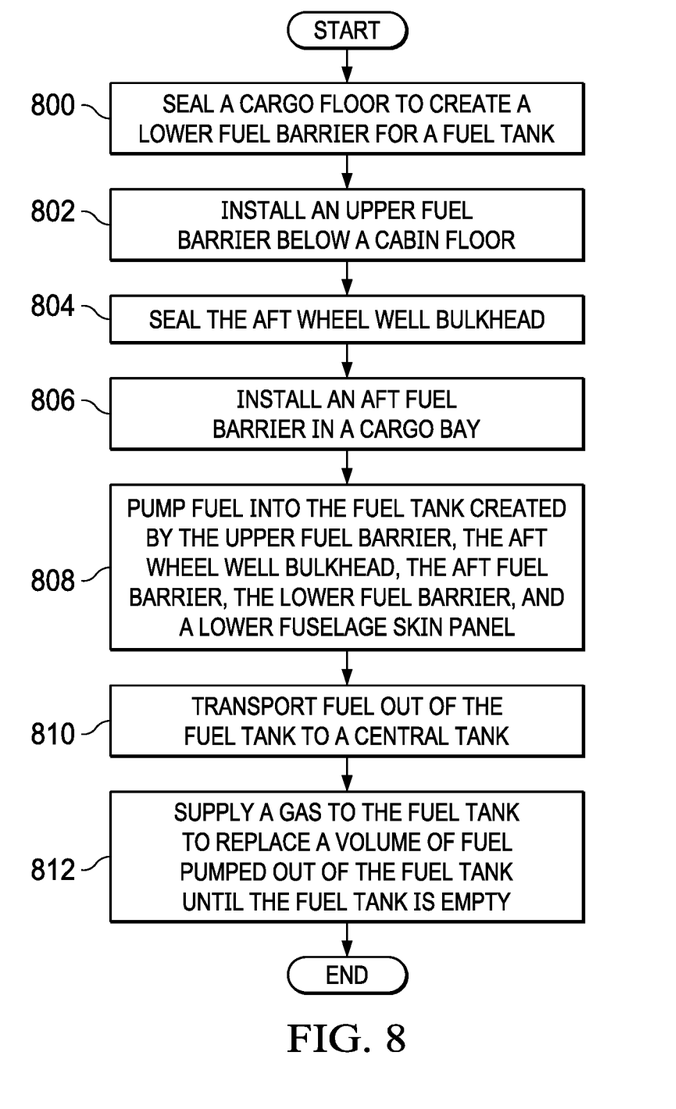
FIG. 8 is an illustration of a flowchart of a process for containing fuel in an aircraft in accordance with an illustrative embodiment.

With reference next to FIG. 8, an illustration of a flowchart of a process for containing fuel in a fuel tank is depicted in accordance with an illustrative embodiment. The method depicted in FIG. 8 may be used with fuel containment system 202 in FIG. 2 to improve fuel capacity in aircraft 200 while minimizing weight increases.

The process begins by sealing a lower fuel barrier associated with a cargo floor (operation 800). Next, an upper fuel barrier is installed below a cabin floor (operation 802).

The aft wheel well bulkhead is sealed (operation 804). The process then installs an aft fuel barrier in a cargo bay (operation 806). Fuel is pumped into a fuel tank created by the upper fuel barrier, the aft wheel well bulkhead, the aft fuel barrier, and the lower fuel barrier (operation 808).

As the aircraft is in operation, fuel is transported out of the fuel tank to a central tank (operation 810). A gas is supplied to the fuel tank to replace a volume of fuel pumped out of the fuel tank until the fuel tank is empty (operation 812), with the process terminating thereafter.

Figure 9:
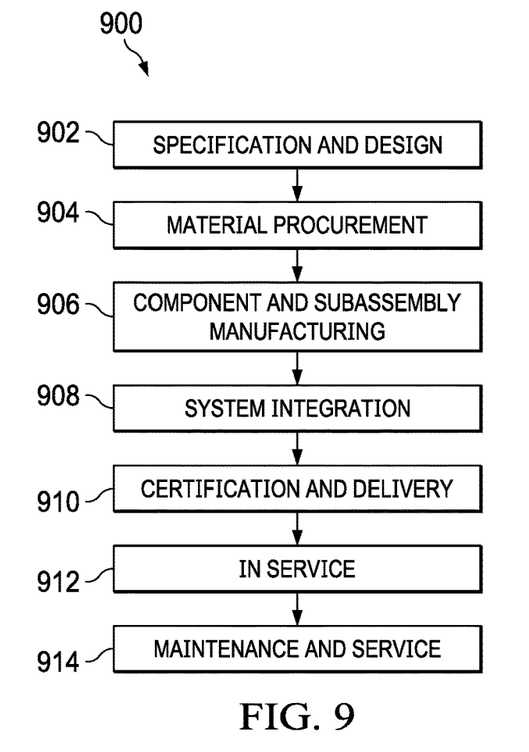
FIG. 9 is an illustration of a block diagram of an aircraft manufacturing and service method in accordance with an illustrative embodiment.
Figure 10:
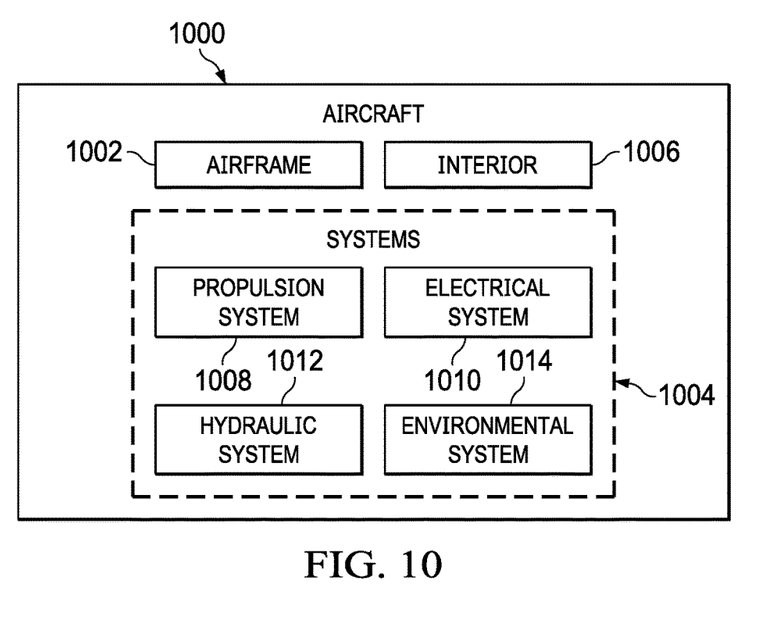
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Fuel containment system 202 from FIG. 2 may be made during component and subassembly manufacturing 906. In addition, components within fuel containment system 202 may be implemented during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which a composite structure made using an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

With the use of an illustrative embodiment, the needs identified in the aerospace field can be alleviated by a fuel tank that is permanent and light weight because it uses the fuselage skin as the fuel barrier. The airplane will have more fuel volume with little to no additional structure.

An illustrative embodiment may be implemented to meet crashworthiness index scores in aircraft, as well as other applications. The apparatuses and methods disclosed herein reduce weight while providing more range for the aircraft as less cost to cargo space than currently used auxiliary fuel tanks.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fuel containment system for an aircraft, the fuel containment system comprising:
    an upper fuel barrier located below a cabin floor of the aircraft and configured to prevent fuel from contacting the cabin floor;
    an aft wheel well bulkhead of the aircraft;
    an aft fuel barrier sealed with vertical support members of the aircraft, the aft fuel barrier opposite the aft wheel well bulkhead;
    a lower fuel barrier sealed and integrated with a cargo floor of the aircraft;
    a lower fuselage skin panel of the aircraft; and
    longitudinal beams under the cabin floor running a length from the aft wheel well bulkhead to the aft fuel barrier.

2. The fuel containment system of claim 1 further comprising:
    a fuel tank created by the upper fuel barrier, the aft wheel well bulkhead, the aft fuel barrier, the lower fuel barrier, and the lower fuselage skin panel.

3. The fuel containment system of claim 2 further comprising:
    a fuel supply system inside the fuel tank, wherein the fuel supply system is configured to transport the fuel out of the fuel tank.

4. The fuel containment system of claim 2, wherein the fuel tank is integrated into a cargo bay, and wherein the fuel tank is under cabin pressure.

5. The fuel containment system of claim 4, wherein at least one stanchion was removed from the cargo bay to increase a capacity of the fuel tank.

6. The fuel containment system of claim 2 further comprising:
    support members inside the fuel tank and associated with the aft wheel well bulkhead.

7. The fuel containment system of claim 2 further comprising:
    a number of transport elements in fluid communication with the fuel tank and configured to supply a gas to the fuel tank to replace a volume of the fuel pumped out of the fuel tank.

8. The fuel containment system of claim 2 further comprising:
    a fuel bladder inside the fuel tank.

9. The fuel containment system of claim 1 further comprising:
    a channel system between the upper fuel barrier and the cabin floor created by space between a pair of the longitudinal beams, wherein an electrical system of the aircraft is routed through the channel system.

10. A method for containing fuel in an aircraft, the method comprising:
    sealing a cargo floor to create a lower fuel barrier;
    installing an upper fuel barrier below a cabin floor;
    sealing an aft wheel well bulkhead;
    installing an aft fuel barrier in a cargo bay;
    storing the fuel in a fuel tank created by the upper fuel barrier, the aft wheel well bulkhead, the aft fuel barrier opposite the aft wheel well bulkhead, and a lower fuselage skin panel; and
    removing a number of stanchions from the cargo bay to increase a capacity of the fuel tank.

11. The method of claim 10 further comprising:
    transporting the fuel out of the fuel tank using a fuel supply system located inside the fuel tank.

12. The method of claim 10 further comprising:
    supplying a gas to the fuel tank to replace a volume of the fuel pumped out of the fuel tank.

13. The method of claim 10 further comprising:
    bonding a number of layers of composite material to the lower fuselage skin panel underneath the fuel tank to increase a strength of the lower fuselage skin panel.

14. The method of claim 10 further comprising:
    installing longitudinal beams under the cabin floor and running a length of the fuel tank from the aft wheel well bulkhead to the aft fuel barrier.

15. The method of claim 10 further comprising:
    sealing the lower fuselage skin panel from the cargo floor to the upper fuel barrier within the fuel tank.

16. A fuel containment system for an aircraft, the fuel containment system comprising:
    an upper fuel barrier below a cabin floor of the aircraft;
    an aft wheel well bulkhead of the aircraft;
    an aft fuel barrier sealed with vertical support members of the aircraft, the aft fuel barrier opposite the aft wheel well bulkhead;
    a lower fuel barrier sealed and integrated with a lower fuselage skin panel of the aircraft; and longitudinal beams under the cabin floor running from the aft wheel well bulkhead to the aft fuel barrier.

17. The fuel containment system of claim 16 further comprising:
- a fuel tank formed from the upper fuel barrier, the aft wheel well bulkhead, the aft fuel barrier, and the lower fuselage skin panel; and
- a fuel bladder inside the fuel tank.

18. The fuel containment system of claim 17, further comprising:
- a fuel supply system inside the fuel tank.

19. The fuel containment system of claim 17 further comprising:
- a number of layers of composite material bonded to the lower fuselage skin panel, wherein the number of layers of composite material is configured to increase a strength of the lower fuselage skin panel.

20. The fuel containment system of claim 17 further comprising:
- a number of transport elements in fluid communication with the fuel tank; and
- a gas supply source associated with the number of transport elements.

\* \* \* \* \*